(12) United States Patent
Feng et al.

(10) Patent No.: US 8,588,993 B2
(45) Date of Patent: Nov. 19, 2013

(54) VOLTAGE REGULATION OPTIMIZATION

(75) Inventors: Xiaoming Feng, Cary, NC (US); Fang Yang, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 901 days.

(21) Appl. No.: 12/613,265

(22) Filed: Nov. 5, 2009

(65) Prior Publication Data

US 2010/0114400 A1    May 6, 2010

Related U.S. Application Data

(60) Provisional application No. 61/111,585, filed on Nov. 5, 2008.

(51) Int. Cl.
*G06F 9/00* (2006.01)
(52) U.S. Cl.
USPC .............. 700/298; 700/286; 361/62; 307/31; 703/18
(58) Field of Classification Search
USPC .......... 700/286, 298; 361/62; 307/31; 703/18
See application file for complete search history.

(56) References Cited

U.S. PATENT DOCUMENTS

| | | | |
|---|---|---|---|
| 4,916,377 A | 4/1990 | Terada et al. | |
| 5,422,561 A | 6/1995 | Williams et al. | |
| 5,541,498 A | 7/1996 | Beckwith | |
| 5,642,000 A * | 6/1997 | Jean-Jumeau et al. | 307/31 |
| 5,734,586 A | 3/1998 | Chiang et al. | |
| 2005/0099747 A1* | 5/2005 | Zima et al. | 361/62 |

FOREIGN PATENT DOCUMENTS

| | | |
|---|---|---|
| EP | 1418477 A1 | 5/2004 |
| WO | 2010054084 A3 | 5/2010 |

OTHER PUBLICATIONS

Penido D R R et al."Three-Phase Power Flow Based on Four-Conductor Current Injection Method for Unbalanced Distribution Networks" IEEE Transactions on Power Systems, IEEE Service Center, Piscataway, NJ, US vol. 23 No. 2, May 1, 2008 pp. 494-503, XP011207990.
J.J.Grainger and S.Civanlar,"Volt/Var Control on Distribution Systems with Lateral Branches Using Shunt Capacitors and Voltage Regulators—Part 1: The Overall Problem," IEEE Trans. Power Apparatus and Systems, vol. PAS-104, No. 11, pp. 3278-3283, Nov. 1985.
S.Civanlar and J.J.Grainger,"Volt/Var Control on Distribution Systems with Lateral Branches Using Shunt Capacitors and Voltage Regulators—Part 2: The Solution Method," IEEE Trans. Power Apparatus and Systems vol. PAS-104, No. 11. pp. 3284-3290, Nov. 1985.
R.Baldick and F.F. Wu,"Efficient Integer Optimization Algorithms for Optimal Coordination of Capacitors and Regulators," IEEE Trans. Power Systems, vol. 5. No. 3, pp. 805-812, Aug. 1990.
I.Roytelman, B.K.Wee and R.L. Lugtu, "Volt/Var Control Algorithm for Modern Distribution Management System," IEEE Trans. Power Systems, vol. 10, No. 3, pp. 1454-1460, Aug. 1995.

(Continued)

*Primary Examiner* — Tejal Gami
(74) *Attorney, Agent, or Firm* — Michael Charles Prewitt; Denis Ticak

(57) ABSTRACT

A voltage regulation optimization (VRO) system receives inputs from a DCS or other distribution network control/monitoring system. The VRO then calculates optimized control commands for various network devices including the controllable taps of voltage regulating transformers.

8 Claims, 5 Drawing Sheets

(56) References Cited

OTHER PUBLICATIONS

I.Roytelman, B.K.Wee, R.L. Lugtu, T.M.Kulas and T.Brossart,"Pilot Project to Estimate the Generalized Volt/Var Control Effectiveness," IEEE Trans. Power Systems, vol. 13, No. 3. pp. 864-869, Aug. 1998.

S.J.Cheng, O.P.Malik and G.S.Hope,"An Expert System for Voltage and Reactive Power Control of a Power System," IEEE Trans. Power Systems, vol. 3, No. 4, pp. 1449-1455, Nov. 1988.

\* cited by examiner

VOLTAGE REGULATION OPTIMIZATION

This application claims priority to provisional application No. 61/111,585 filed on Nov. 5, 2008 the contents of which are incorporated in their entirety.

BACKGROUND

In electricity distribution systems, loss occurs when current flows through the conductors in the system. This energy loss through a conductor may be calculated according to $I^2R$, where I is the current through conductor whose resistance is R. The net demand or current flow also depends on the voltage profile on the feeders. Reactive compensation can reduce unnecessary current flows and in turn reduce losses. Voltage regulation affects the effective loading of feeders due to the voltage dependence characteristics of the loads, as well as the energy losses.

Voltage and Var optimization (VVO) systems are employed in electricity distribution systems to optimize the distribution of voltages and currents on distribution systems. VVO systems endeavor to maximize efficiency (minimize MW loss minimization or MW demand) of energy delivery by controlling voltage regulators (Voltage) and reactive power resources (Var) by employing online system models and demand forecasts.

With reference to FIG. 1, an electricity distribution network is shown. As can be seen, a substation provides power to a plurality of loads through the substation transformers, feeders, and laterals. Distributed at various points in the distribution network are capacitor banks C that may be fixed or switched, and voltage regulators that can be locally or remotely controlled to alter the tap settings. The connectivity of the network and the status of the various equipment, such as transformers, loads, capacitors, voltage regulators, are monitored via sensors and a communication infrastructure. Monitored data may include voltage, current and/or power at or through various points or conductors. This information is transmitted to a distribution management system (DMS) or a substation automation system (SAS). Upon receiving the updated status information, the system model (load flow model) within the DMS is updated. A load forecast is performed based on the SCADA data, customer billing data, and/or data collected from advanced metering infrastructure (AMI). The VVO, based on the load forecasts, the system model, and the available control information, then determines the best tap settings for the voltage regulators and on load tap change (OLTC) transformers, and the Var resources such as switched shunt capacitors or reactors. Control commands are then transmitted back to the various elements in the distribution grid where the control actions are carried out, bring the system to a more efficient operating state.

VVO is the decision making process that analyzes the input data from the field and generates the control signals to be transmitted to the controllers in the filed. Voltage regulation optimization (VRO) is a subsystem of a VVO system. The VRO may work stand alone or in conjunction with a Var optimization (VARO) to provide integrated VVO solutions.

The concept of demand reduction on electric distribution systems dates back several decades and many in the industry and the research communities have attempted to develop effective solution methodology and processes. The common practice of energy conservation voltage reduction (ECVR) attempts to reduce demand on distribution systems by lowering the voltage on the feeders as as much as service agreement allows. This approach is not very effective since the underlying assumption is end user loads decrease as voltages decrease, which is only partially true. In reality, some loads are like constant impedances whose loads decreases when voltage decreases. Some loads behave like constant power loads that remain constant regardless voltage decrease or increase. When voltages are reduced on a feeder that has predominantly constant power loads, the effect of voltage reduction is increased net demand, since to maintain constant power, the loads will draw more currents which increase loss on top of the constant power. Systematic approaches are needed to take into consideration the effect of the voltage on the loads when determining if voltages should be increased or reduced and by how much at different locations on the distribution network. This is a difficult integer nonlinear optimization problem with tough constraints. Most solution approaches proposed to date are applicable to small, very simplified academic models, and are not suitable for large scale, meshed, multi-source, multi-phase unbalanced distribution systems that are common in real distribution networks. The deficiencies in conventional methods are due to (1) the model being too simplified to represent a real system, by assuming radial topology, balanced construction and operation, or ignoring the effect of transformer connections (for example, wye to delta connections), (2) the computation efficiency being so low that the solution can not be scaled for either online or offline applications for large system, or (3) the methods are not general enough and have limited optimizing capability.

Thus, there is a need in the art for an optimization solution applicable to large scale, meshed, multi-source, multi-phase unbalanced distribution systems.

SUMMARY OF THE INVENTION

According to one aspect of the present invention, a method is provided for determining optimal settings for controllable taps of voltage regulating transformers in a distribution network. The method includes receiving a network model and solve for unbalanced load flow to determine a set of state variables x using initial control variables u; calculating an overall objective value of the network under initial control variables u or a trial solution for u; constructing a sequence of quadratic programs (QP) based on first order approximation to generate trial solutions and performs full non-linear unbalanced load flow on the trial solution to determine the actual improvement in objective function before accepting the trial solution; discretizing the non-integer QP solution and perform systematic adjustment to identify a trial solution that produces performance improvement in non-linear unbalanced load flow simulation; initially generating a best control setting and associated objective value, iteratively updating the best solution and objective value; and outputting the best control setting to a distribution control system.

BRIEF DESCRIPTION OF THE DRAWING FIGURES

DETAILED DESCRIPTION OF THE INVENTION

Figure 1:
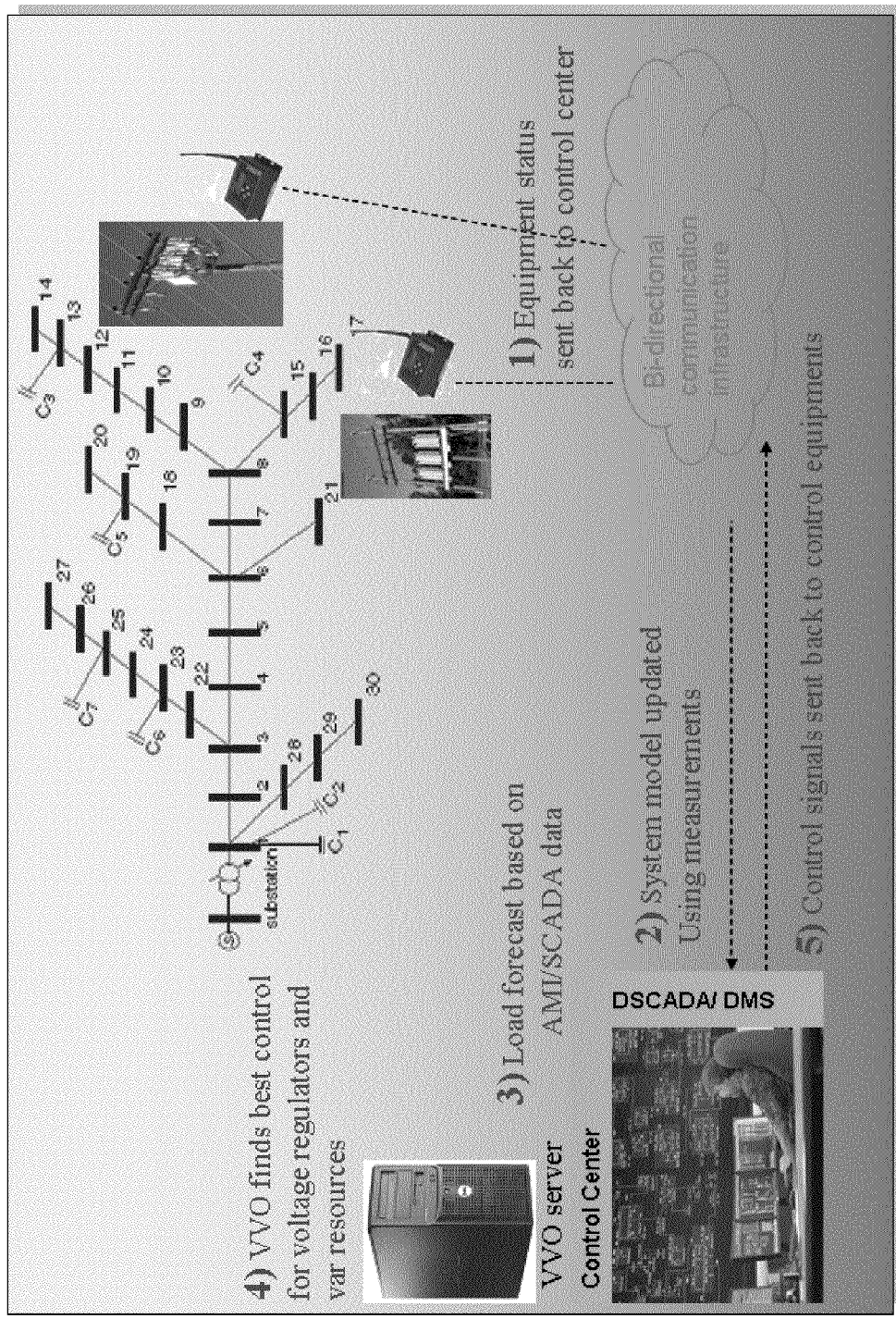
FIG. 1 is a partially schematic view of an electrical distribution system employing a DMS system.

The purpose of the VRO is to find the optimal integer solution for the controllable taps of voltage regulating transformers in order to minimize the energy loss or the total demand extracted by a distribution circuit from the substation(s). In the following discussion, the settings of the switchable shunt capacitors/reactors are assumed to be fixed.

State variables are the phase specific voltages at every node of the system in either polar or rectangular coordinate. The state variable vector is designated by x. Control variables for VRO are the ganged (all three phases operated in unison) or un-ganged (each phase is controlled separately) tap changer controls of voltage regulating transformers. The control variable vector is designated by u.

The purpose of the VRO is to minimize an objective function, which can be either the energy loss, or the total demand of a distribution circuit, depending on user preference and selection. The loss and demand are functions of the system state variables. The objective function is denoted by $f(x, u)$. There can be several variations of the expression of $f(x,u)$ depending on whether total demand or total loss is minimized. The exemplary embodiment below describes minimizing the total demand to illustrate the solution process. In this case:

$$f(x, u) = \text{total\_demand} = \sum_{k \in K} \sum_{j \in B(k)} (v_k^d i_{k,j}^d + v_k^q i_{k,j}^q),$$

where
K is the set of source nodes and B(k) is the set of branches emanating from source node k. $v_k^d, v_k^q$ are the real and imaginary parts of the voltage at source node k. $i_{k,j}^d, i_{k,j}^q$ are the real and imaginary parts of the current on branch from source node k to node j. Each of the quantities involved is a function of the state variables and the control variables. We can use $v_K^d, v_K^q, i_K^d, i_K^q$ to denote the vectors for the source node voltages and current emanating from the source nodes.

Power flow balance constraints must be satisfied at every node for every phase present. The nodal power balance equations are non-linear equality constraints. The power flow equations are denoted by g(x,u)=0 in vector form. Voltage magnitude is constrained at every load connection or other point of concern. For a wye connected load, the phase to neutral voltage magnitude is used. For a delta connected load, the phase to phase voltage magnitude is used. Each voltage magnitude must operate within a user specified upper and lower limit, for example +/−5% or nominal value. The voltage constraints are designated by $v^{lb} \leq v(x,u) \leq v^{ub}$ in vector form.

Constraints are also present for current flowing through cables, overhead lines, and transformers. The current flowing through a conductor must be within a user specified maximum. The current constraints are designated by $i(x,u) \leq i^{ub}$ in vector form. Constraints also exist on control variables for every independent control. These constraints are designated by $u^{lb} \leq u \leq u^{ub}$. Additional constraints can be incorporated into the problem without affecting the design of the solution process.

Figure 2:
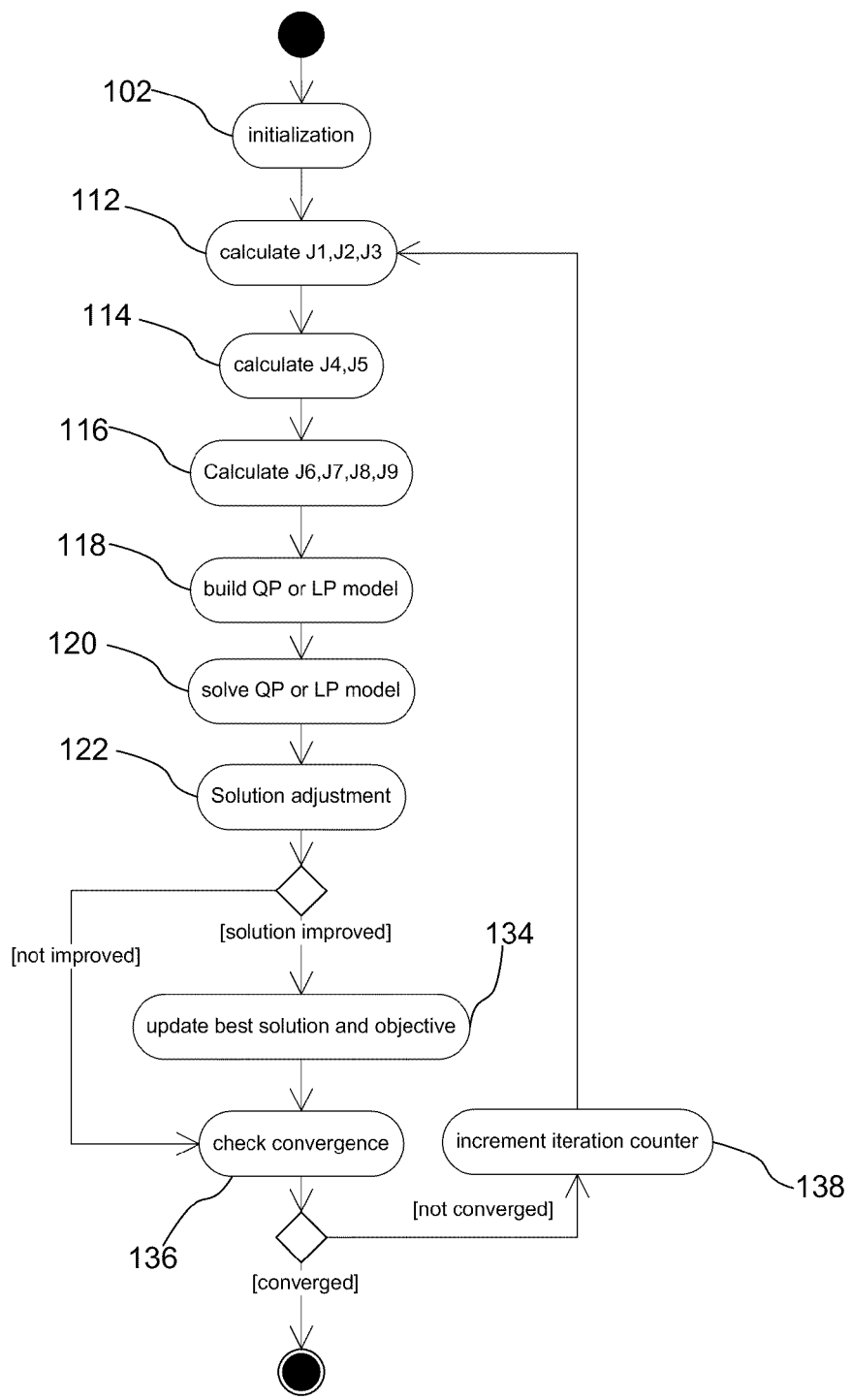
FIG. 2 is a flow chart showing the voltage regulation optimization process overview.
Figure 3:
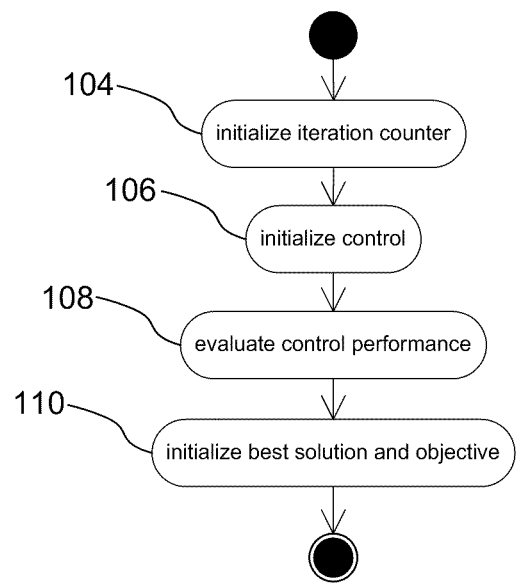
FIG. 3 is a flow chart showing a detailed view of the initialization steps of the VRO process.
Figure 5:
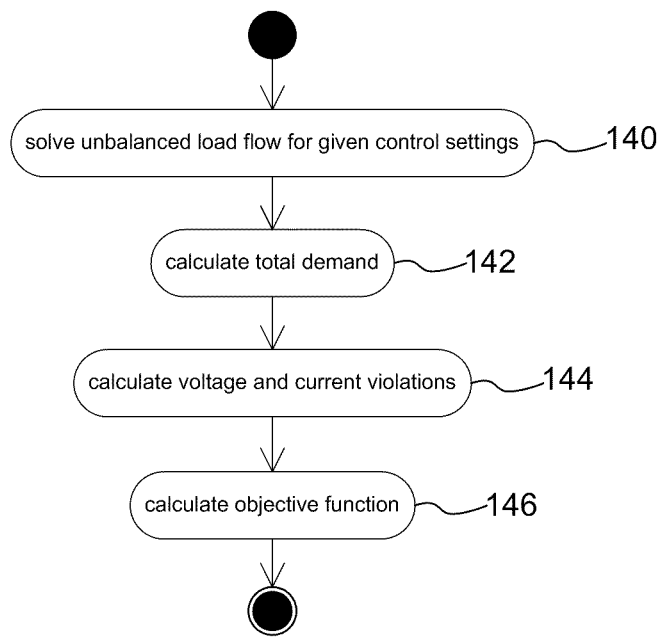
FIG. 5 is a flow chart showing the solution performance evaluation steps of the VRO process.

With reference now to FIG. 2, an overview of the method according to the present invention is shown. As can be seen, at a first step 102, the process is initialized. FIG. 3 shows a more detailed description of the initialization process wherein, at 104 an optimization iteration counter is initialized. This counter is later incremented during the iteration process to keep track of the number of iterations performed and used for the purpose of algorithm termination. At 106 the controls are initialized. The control variables are initialized to some starting values, which can be a default value, the current settings in the system model, or from previous solution of the same system. At 108 the control performance at the initial control settings is evaluated. The objective function is calculated for the given control variable values. With reference to FIG. 5 a more detailed description is shown of how the performance is evaluated at any specified control setting. At 140 a multiphase unbalanced load flow is solved to determine the state variable x with the control variables u set at the given value. The unbalanced load flow can be solved by any unbalanced load flow solver such as found in some distribution management system (DMS). At 142 the total MW demand is calculated for the circuits under analysis. At 144, any voltage and current violations are calculated. Finally, at 146, an overall objective value is calculated as the sum of total demand and absolute value of the individual violation weighted by a sufficiently large configurable penalty factor. Referring again to FIG. 3, at 110 the best solution and objective for VRO are initialized to the initial control and the corresponding performance evaluation.

With reference again to FIG. 1, after initialization, matrix $J_1$, $J_2$, $J_3$ are calculated at 112. A Jacobian matrix $J_1$ is calculated according to following definition at the current u and x $$J_1 = \frac{\partial g}{\partial x},$$

which is the Jacobian of power flow equations with respect to the system state variables. This matrix can be provided by the unbalanced load flow solver if such interface is provided.

A Jacobian matrix $J_2$ is calculated according to following definition at the current u and x $$J_2 = \frac{\partial g}{\partial u},$$

which is the Jacobian of power flow equations with respect to the control variables. This matrix can be provided by the unbalanced load flow solver if such interface is provided.

A Jacobian matrix $J_3$ is calculated according to following definition at the current u and x $$J_3 = -\left(\frac{\partial g}{\partial x}\right)^{-1} \frac{\partial g}{\partial u},$$

which is the Jacobian of state variables with respect to the control variables under the constraints of power flow equations.

At 114, $J_4$, $J_5$ are calculated. Jacobian matrix $J_4$ is calculated for the voltage magnitude constraints according to following definition at the current u and x $$J_4 = \frac{\partial v}{\partial u} + \frac{\partial v}{\partial x} \cdot J_3$$

Jacobian matrix $J_5$ is calculated for the current magnitude constraints according to following definition at the current u and x $$J_5 = \frac{\partial i}{\partial u} + \frac{\partial i}{\partial x} \cdot J_3$$

At 116, $J_6$, $J_7$, $J_8$, $J_9$ are calculated according to the following equations:

$$J_6 = \frac{\partial v_K^d}{\partial u} + \frac{\partial v_K^d}{\partial x} \cdot J_3$$
$$J_7 = \frac{\partial v_K^q}{\partial u} + \frac{\partial v_K^q}{\partial x} \cdot J_3$$
$$J_8 = \frac{\partial i_K^d}{\partial u} + \frac{\partial i_K^d}{\partial x} \cdot J_3$$
$$J_9 = \frac{\partial i_K^q}{\partial u} + \frac{\partial i_K^q}{\partial x} \cdot J_3$$

Given these Jacobian matrix calculated above, any nonlinear quantity in the original problem can be approximated by a first order expansion around the current control setting u(0). For example:
i(x,u)=i(x(u(0)),u(0))+$J_5$(u−u (0))≤$i^{th}$, where u(0) is the current operating point. When the objective function is expressed in different forms, such as loss plus load, the Jacobeans calculated here are slightly different, but the concept and process remain identical.

At 118 a quadratic program (QP) or linear program (LP) model is constructed using the first order approximation of the current and voltage quantifies in the objective function and the constraints. When the nonlinear quantities in the original optimization problem are replaced by their first order expansions by using the Jacobeans $J_4$ through $J_9$, a quadratic programming (QP) problem is generated. Depending on the boundary conditions, the QP may degenerate into an LP (linear program) if the source voltage magnitudes do not change with control variable u, i.e, when the source is an ideal source (also known as an infinite bus) whose voltages do not respond to changes in the control setting, in this case, the objective function will be linear in the current variables. A step size is introduced to the QP to limit the maximum control changes, i.e., u−u (0), allowed in a single iteration to prevent overshoot. The same penalty weighting as in the solution performance evaluation is used in the QP to reduce voltage or current violations.

Figure 4:
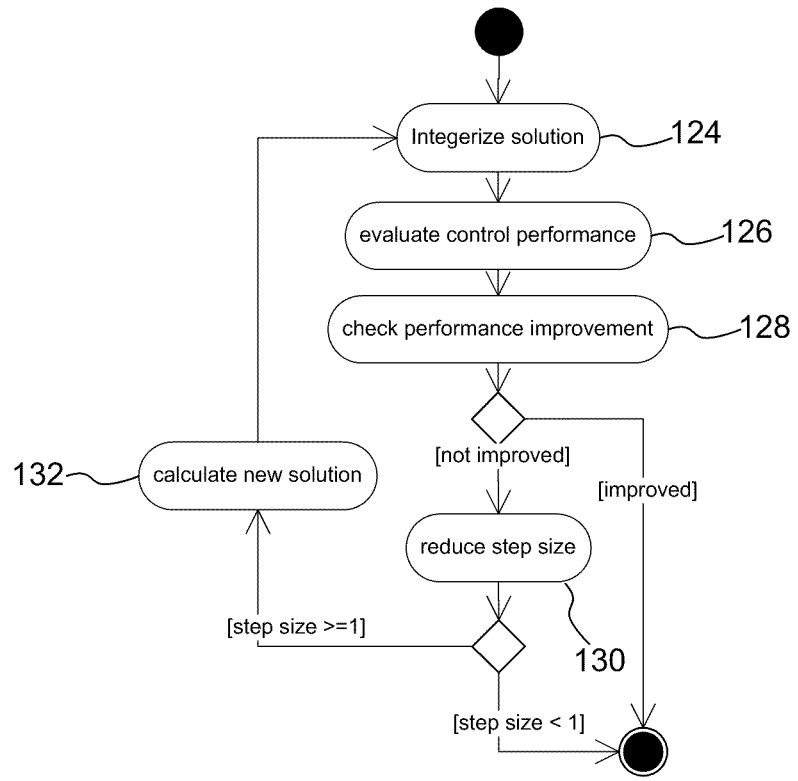
FIG. 4 is a flow chart showing a detailed view of the solution adjustment steps of the VRO process.

At 120 the QP or LP problem is solved by a general purpose QP solver to get the proposed control changes. At 122 the proposed solution update is adjusted. With reference to FIG. 4, a more detailed view of the solution adjustment is shown. At 124 the solution for the QP or LP is converted to nearest integer. It should be appreciated, however, that simple variants such as discretization by truncation can de used without changing the overall solution process and architecture. A trial control setting vector is thus calculated by applying the update to the initial value for the current iteration. The trial solution's performance is evaluated at 126. Performance is evaluated as discussed above and with reference again to FIG. 5. The improvement, as defined as the difference between the performance at the trial solution and the best solution found by VRO so far, is checked at 128. If the performance improves i.e., the objective function value is lower at the trial solution than at the best solution found so far, exit. If performance does not improve, at 130 the step size is reduced by a reduction factor β, 0<β1. If the new step size is less than 1, exit. Otherwise, at 132, a new control correction vector is calculated using the new step size along the same feasible direction as proposed by the QP solution, and the solution adjustment is repeated.

Referring again to FIG. 2, if the solution improved, at 134 the best solution and the corresponding objective value are updated with the solution found at this iteration. If the solution is not improved, step 134 is skipped. At 136 convergence is checked. Convergence criteria can be a combination of absolute improvement, percentage of improvement in the objective value, step size reduced to less than 1, or an iteration limit has been reached. If converged, the process terminates, otherwise, the iteration counter is incremented at 138 and the process is repeated.

The output of the solution process will be an optimal control vector of which each element is the best setting for the corresponding tap changer. VRO in a control center can be invoked periodically, for instance, every hour, by a timer, or on demand by operator action.

The process according to the present invention has improved generality, such that it is able to handle multi-phase, multi-source, unbalanced, meshed system, as well as different transformer connections (wye/delta, wye/wye, delta/delta, etc), ganged, or un-ganged control. Most importantly, it automatically accounts for the voltage dependence characteristics of loads (by means of the information of $J_3$) and is able to automatically determine to raise or lower voltage depending the location, magnitude, and the type of loads. Further, the process is able to optimize large scale systems efficiently. The process delivers high quality solutions due to the optimization theoretic based approach. Every trial solution, although obtained through approximate model, is tested on full nonlinear load flow model for performance before being accepted during the iterative oprimization process. The process is flexible enough to handle engineering constraints like phase to neutral, phase to phase voltage constraints, current constraints through cables, overhead lines, and transformers. The process may even be implemented in systems including distributed generation.

As can be appreciated by one of ordinary skill in the art, the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a flash drive, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the present invention may be written in an object oriented programming language such as Java, Smalltalk, C++ or the like, or may also be written in conventional procedural programming languages, such as the "C" programming language. The program code may execute entirely in a DMS system, or a separate computer as a stand-alone software package.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A computer program product for determining optimal settings for controllable taps of voltage regulating transformers in a distribution network, comprising:
   a non-transitory computer readable medium having computer readable code embedded therein, the non-transitory computer readable medium comprising:
      program instructions that receive a network model and solve for unbalanced load flow to determine a set of state variables x using initial control variables u;
      program instructions that calculate an overall objective value of the network under initial control variables u or a trial solution for u;
      program instructions that construct a sequence of quadratic programs (QP) based on first order approximation to generate trial solutions and performs full non-linear unbalanced load flow on the trial solution to determine the actual improvement in objective function before accepting the trial solution;
      program instructions that discretize the non-integer QP solution and perform systematic adjustment to identify a trial solution that produces performance improvement in non-linear unbalanced load flow simulation; and
      program instructions that calculate jacobian matrix $J_1$-$J_9$ according to the equations, $$J_1 = \frac{\partial g}{\partial x}; J_2 = \frac{\partial g}{\partial u}; J_3 = -\left(\frac{\partial g}{\partial x}\right)^{-1} \frac{\partial g}{\partial u};$$

$$J_4 = \frac{\partial v}{\partial u} + \frac{\partial v}{\partial x} \cdot J_3; J_5 = \frac{\partial i}{\partial u} + \frac{\partial i}{\partial x} \cdot J_3; J_6 = \frac{\partial v_K^d}{\partial u} + \frac{\partial v_K^d}{\partial x} \cdot J_3$$

$$J_7 = \frac{\partial v_K^q}{\partial u} + \frac{\partial v_K^q}{\partial x} \cdot J_3; J_8 = \frac{\partial i_K^d}{\partial u} + \frac{\partial i_K^d}{\partial x} \cdot J_3; J_9 = \frac{\partial i_K^q}{\partial u} + \frac{\partial i_K^q}{\partial x} \cdot J_3.$$

2. The computer program product according to claim 1 wherein the computer readable medium further comprises program instructions that initially generate a best control setting and associated objective value, and iteratively update the best solution and objective until none can be found.

3. The computer program product according to claim 1 wherein the computer readable medium further comprises program instructions that build said quadratic problem using said $J_1$-$J_9$.

4. The computer program product according to claim 3 wherein the computer readable medium further comprises program instructions that check for convergence, wherein if convergence is determined, the best control set is output and if not converged, the program returns to said step of calculating jacobian matrix $J_1$-$J_9$ and constructing new QP and proposing trail correction to the control variables by solving the QP.

5. A method for determining optimal settings for controllable taps of voltage regulating transformers in a distribution network, comprising:

receiving a network model and solve for unbalanced load flow to determine a set of state variables x using initial control variables u;

calculating an overall objective value of the network under initial control variables u or a trial solution for u;

constructing a sequence of quadratic programs (QP) based on first order approximation to generate trial solutions and performs full non-linear unbalanced load flow on the trial solution to determine the actual improvement in objective function before accepting the trial solution;

discretizing the non-integer QP solution and perform systematic adjustment to identify a trial solution that produces performance improvement in non-linear unbalanced load flow simulation;

initially generating a best control setting and associated objective value, and iteratively updating the best solution and objective value;

outputting said best control setting to a distribution control system; and calculating jacobian matrix $J_1$-$J_9$ according to the equations, $$J_1 = \frac{\partial g}{\partial x}; J_2 = \frac{\partial g}{\partial u}; J_3 = -\left(\frac{\partial g}{\partial x}\right)^{-1} \frac{\partial g}{\partial u};$$

$$J_4 = \frac{\partial v}{\partial u} + \frac{\partial v}{\partial x} \cdot J_3; J_5 = \frac{\partial i}{\partial u} + \frac{\partial i}{\partial x} \cdot J_3; J_6 = \frac{\partial v_K^d}{\partial u} + \frac{\partial v_K^d}{\partial x} \cdot J_3$$

$$J_7 = \frac{\partial v_K^q}{\partial u} + \frac{\partial v_K^q}{\partial x} \cdot J_3; J_8 = \frac{\partial i_K^d}{\partial u} + \frac{\partial i_K^d}{\partial x} \cdot J_3; J_9 = \frac{\partial i_K^q}{\partial u} + \frac{\partial i_K^q}{\partial x} \cdot J_3.$$

6. The method according to claim 5 wherein the method further includes building said quadratic problem using said $J_1$-$J_9$.

7. The method according to claim 5 wherein the method further includes checking for convergence, wherein if convergence is determined, the best control set is output and if not converged, the program returns to said step of calculating jacobian matrix $J_1$-$J_9$ and constructing new QP and proposing trail correction to the control variables by solving the QP.

8. A computer program product for determining optimal settings for controllable taps of voltage regulating transformers in a distribution network, comprising: a non-transitory computer readable medium having computer readable code embedded therein, the non-transitory computer readable medium comprising:

(a) program instructions that receive a network model and solve for unbalanced load flow to determine a set of state variables x using initial control variables u;

(b) program instructions that calculate an overall objective value of the network under initial control variables u or a trial solution for u;

(c) program instructions that construct a sequence of quadratic programs (QP) based on first order approximation to generate trial solutions;

(d) program instructions that perform full non-linear unbalanced load flow on the trial solution to determine the actual improvement in objective function before accepting the trial solution;

(e) program instructions that discretize the non-integer QP solution and perform systematic adjustment to identify a trial solution that produces performance improvement in non-linear unbalanced load flow simulation; and (f) program instructions that calculate jacobian matrix $J_1$-$J_9$ according to the equations, $$J_1 = \frac{\partial g}{\partial x}; J_2 = \frac{\partial g}{\partial u}; J_3 = -\left(\frac{\partial g}{\partial x}\right)^{-1}\frac{\partial g}{\partial u};$$

$$J_4 = \frac{\partial v}{\partial u} + \frac{\partial v}{\partial x} \cdot J_3; J_5 = \frac{\partial i}{\partial u} + \frac{\partial i}{\partial x} \cdot J_3; J_6 = \frac{\partial v_K^d}{\partial u} + \frac{\partial v_K^d}{\partial x} \cdot J_3$$

$$J_7 = \frac{\partial v_K^q}{\partial u} + \frac{\partial v_K^q}{\partial x} \cdot J_3; J_8 = \frac{\partial i_K^d}{\partial u} + \frac{\partial i_K^d}{\partial x} \cdot J_3; J_9 = \frac{\partial i_K^q}{\partial u} + \frac{\partial i_K^q}{\partial x} \cdot J_3.$$

\* \* \* \* \*